Patented June 16, 1953

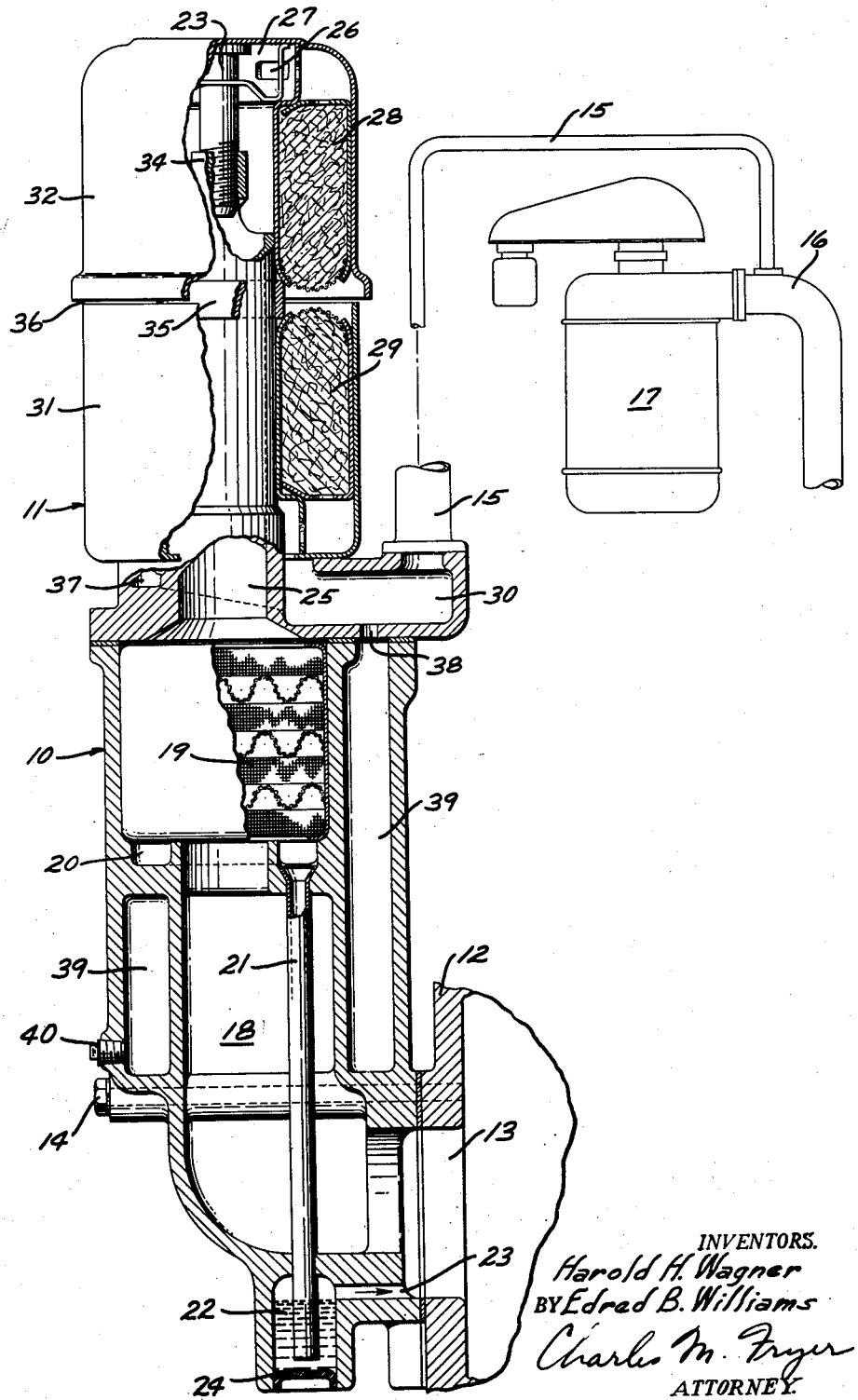

2,642,052

UNITED STATES PATENT OFFICE 2,642,052

ENGINE CRANKCASE BREATHER AND OIL SEPARATOR

Harold H. Wagner, Peoria, Ill., and Edred B. Williams, Indianapolis, Ind., assignors to Caterpillar Tractor Co., Peoria, Ill., a corporation of California Application October 25, 1952, Serial No. 316,824

5 Claims. (Cl. 123—119)

This invention relates to engine crankcase breathers and oil separators for use on integral combustion engines for separating oil and dirt from the blow by gases discharging from the crankcase as a result of pressure escaping from the combustion chambers of the engine between the piston and the cylinder walls.

It is the object of the invention to provide an engine crankcase breather and oil separator which comprises two separate filtering or separating assemblies operating in series and means for collecting and returning the major portion of oil separated by the first assembly to the crankcase, while separating and preventing return of further oil likely to be contaminated with dust or abrasives.

A further object of the invention is to provide a device of this kind with means for directing clean blow by gases to the intake manifold of the engine for consumption with main fuel together with additional air and so constructed that it will indicate the presence of extensive quantities of blow by gases issuing from the crankcase. Further objects and advantages of the invention are made apparent in the following specification where a preferred form of the invention is disclosed in detail by reference to the accompanying drawing.

The drawing is a central vertical cross section of an engine crankcase breather and oil separator employing the present invention with an air cleaner and air intake pipe which leads to the intake manifold of the engine schematically shown.

In the drawing the invention is shown as comprising a pair of filtering or condensing units 10 and 11. The first unit 10 is secured to a wall of an engine crankcase, a portion of which is shown at 12. The wall has an opening 13 through which blow by gas is exhausted. Cap screws, one of which is illustrated at 14, may be used for supporting the assembly 10 in place. The second assembly 11 communicates with and is connected with the first assembly 10 by any suitable means (not shown) and it has a discharge pipe 15 which leads to a pipe 16 communicating between a conventional air cleaner 17 and the air intake manifold of the engine (not shown).

As the blow by gas issues through the opening 13, it passes upwardly through a central conduit 18 in the assembly 10 and then through a filter or condensing unit consisting of a stack of screens 19 of any conventional kind. Since the oil collected or condensed by the screens 19 has not been contaminated by mixture with dust laden air of the atmosphere, it is desirably collected and returned to the engine crankcase. This is accomplished by the provision of an annular chamber 20 just beneath the screens 19 and a tube 21 communicating between said chamber and a trap 22 formed in the lowermost portion of the assembly 10. A port 23 leads from the upper portion of the trap 22 back into the engine crankcase. The bottom of the trap 22 is made by a press fitted cap 24 for convenience in manufacture. The lower end of the tube 21 extends below the oil level in the trap which is maintained by the height of the outlet port 23 and in this manner a liquid seal is established to prevent blow by gas from passing upwardly through the tube 21. The relatively clean blow by gas which passes the screens 19 next passes through a central chamber 25 in the second filter assembly 11 and within the top of the assembly it passes through ports 26 in an annular spacer 27 and then downwardly through a filter element 28 and a similar filter element 29 both composed of metal wool, or other suitable filtering medium capable of removing free oil or dust contained by the gas.

After the gas has passed through filter elements 28 and 29, it flows through a chamber 30 to the discharge pipe 15 and is directed thereby and by the pipe 16 to the intake manifold of the engine. Under ordinary circumstances, the capacity of the pipe 15 is greater than that required for the passage of the normal quantity of blow by gas issuing from the crankcase of the engine and since it is in communication with the partial vacuum in the intake manifold of the engine, it is desirable to provide for additional or make up air to supplement the gases passing through the pipe 15. To accomplish this, the filter assembly 11 has a space 36 between the lower half 31 of its housing and the upper half 32. The upper half is removably secured in place by a central threaded stud 33 which fits a threaded boss 34 at the upper end of the conduit 25. A spacer ring 35 encircles the conduit 25 to insure against closing of this make up air inlet passage. The air entering through the passage 36 is filtered by the filter element 29 for the purpose of removing dust and abrasives borne by it. This passage 36 also serves as a breathing passage for the engine crankcase which takes in air, for example, when it is cooling after operation. In this event, the filter 28 would serve to remove the air borne dust. Since both the filters 28 and 29 are under certain conditions subjected to dust and abrasives, the oil which they remove from the gas passing through them as it flows toward the engine is unfit for return to the engine crankcase in the manner of the oil from the filter screens 19. Therefore, any oil draining from the filters 28 and 29 is received by an annular trough a portion of which is shown at 37 in the lower end of the filter assembly 11 and drains by way of the passage 30 and a port 38 therein into chamber 39 which surrounds the lower portion of the gas conduit 18 in the filter assembly 10. A drain plug 40 is provided adjacent the bottom of the chamber 39 to enable the contaminated oil therein to be drawn off periodically.

The breather and oil separator of the present invention has the advantage that it serves to direct clean gas containing some combustible products to the intake manifold of the engine by which it will be consumed. It also has the advantage of saving and returning to the engine the cleaner oil that is removed from the gas while at the same time preventing return to the engine of that portion of the oil which may be contaminated with abrasive substances. While the air intake 36 serves as a breather opening for the crank case and also admits make up air during engine operation, it has the further function of indicating excessive wear to the engine operator. For example, when the piston rings and the cylinder liners wear to the extent that an excessive quantity of blow by gas discharges from a crankcase, the capacity of the pipe 15 is exceeded and instead of intake air entering through the opening 36, the back pressure in the filter assembly will cause the gas to exhaust through this opening thus serving as an indication of the worn condition of the engine.

We claim:

1. In a breather for permitting the exhaust of blow-by gases from the crankcase of an internal combustion engine, a plurality of filters in series for extracting oil from said blow-by gases and conduits for returning said gases to the engine air intake, separate conduits for directing oil separated by the first of said filters to the engine crankcase and a reservoir for collecting oil separated from the blow-by gases by the latter in the series of filters.

2. In combination with an internal combustion engine having a breather opening in its crankcase, two communicating filter assemblies arranged in series to receive gas from said opening, means to collect oil separated from the gas passing through the first assembly and to return it to the crank case, and means to collect oil in the second assembly and prevent its return to the crankcase.

3. In combination with an internal combustion engine having a breather opening in its crankcase, two communicating filter assemblies arranged in series to receive gas from said opening, means to collect oil separated from the gas passing through the first assembly and to return it to the crankcase, and means to collect oil in the second assembly and prevent its return to the crankcase, said second assembly having two filter elements therein and an air inlet between said elements whereby air passing therethrough toward the crankcase will be filtered and air passing therethrough toward the filter outlet will be filtered.

4. In combination with an internal combustion engine having a breather opening in its crankcase, two communicating filter assemblies arranged in series to receive gas from said opening, means to collect oil separated from the gas passing through the first assembly and to return it to the crankcase, means to collect oil in the second assembly and prevent its return to the crankcase, said second assembly having two filter elements therein and an air inlet between said elements whereby air passing therethrough toward the crankcase will be filtered and air passing therethrough toward the filter outlet will be filtered and means to direct gas from the filter outlet to the engine intake manifold.

5. In combination with an internal combustion engine having a breather opening in its crankcase, two communicating filter assemblies arranged in series to receive gas from said opening, means to collect oil separated from the gas passing through the first assembly and to return it to the crankcase, and means to collect oil in the second assembly and prevent its return to the crankcase, and a liquid seal in the means for returning oil to the crankcase to prevent gas from passing therethrough in opposition to the direction of oil flow.

HAROLD H. WAGNER.
EDRED B. WILLIAMS.

No references cited.